United States Patent
Yamaya et al.

(10) Patent No.: US 10,665,249 B2
(45) Date of Patent: May 26, 2020

(54) SOUND SOURCE SEPARATION FOR ROBOT FROM TARGET VOICE DIRECTION AND NOISE VOICE DIRECTION

(71) Applicant: CASIO COMPUTER CO., LTD., Shibuya-ku, Tokyo (JP)

(72) Inventors: Takashi Yamaya, Fussa (JP); Kouichi Nakagome, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 93 days.

(21) Appl. No.: 15/985,360

(22) Filed: May 21, 2018

(65) Prior Publication Data
US 2018/0374494 A1    Dec. 27, 2018

(30) Foreign Application Priority Data

Jun. 23, 2017  (JP) ................................ 2017-123643

(51) Int. Cl.
*G10L 21/0272* (2013.01)
*G10L 15/25* (2013.01)
(Continued)

(52) U.S. Cl.
CPC .......... *G10L 21/028* (2013.01); *G06K 9/0057* (2013.01); *G06K 9/00228* (2013.01);
(Continued)

(58) Field of Classification Search
CPC . G10L 21/02; G10L 21/0264; G10L 21/0272; G10L 2015/226;
(Continued)

(56) References Cited

U.S. PATENT DOCUMENTS 5,771,306 A * 6/1998 Stork ................. G06K 9/00268
                                                      382/100
6,449,593 B1 * 9/2002 Valve ...................... G10K 11/34
                                                      704/233
(Continued)

FOREIGN PATENT DOCUMENTS

JP      2004334218 A     11/2004
JP      2005253071 A      9/2005
(Continued)

OTHER PUBLICATIONS

Japanese Office Action dated Aug. 6, 2019 (and English translation thereof) issued in Japanese Patent Application No. JP 2017-123643.

*Primary Examiner* — Martin Lerner
(74) *Attorney, Agent, or Firm* — Holtz, Holtz & Volek PC

(57) ABSTRACT

A voice input unit has predetermined directivity for acquiring a voice. A sound source arrival direction estimation unit operating as a first direction detection unit detects a first direction, which is an arrival direction of a signal voice of a predetermined target, from the acquired voice. Moreover, a sound source arrival direction estimation unit operating as a second direction detection unit detects a second direction, which is an arrival direction of a noise voice, from the acquired voice. A sound source separation unit, a sound volume calculation unit, and a detection unit having an S/N ratio calculation unit detect a sound source separation direction or a sound source separation position, based on the first direction and the second direction.

14 Claims, 11 Drawing Sheets

(51) Int. Cl.
*G10L 21/028* (2013.01)
*G06K 9/00* (2006.01)
*G10L 25/51* (2013.01)
*G10L 21/0208* (2013.01)
*G10L 21/0216* (2013.01)
*G10L 15/20* (2006.01)

(52) U.S. Cl.
CPC ..... *G06K 9/00281* (2013.01); *G06K 9/00335* (2013.01); *G06K 9/00523* (2013.01); *G10L 15/25* (2013.01); *G10L 21/0272* (2013.01); *G10L 25/51* (2013.01); *G10L 15/20* (2013.01); *G10L 21/0208* (2013.01); *G10L 2021/02087* (2013.01); *G10L 2021/02166* (2013.01)

(58) Field of Classification Search
CPC .......... G10L 2021/02087; G10L 15/25; H04R 25/40; G06K 9/00335; G06K 9/0057
USPC ............ 704/226, 270, 272; 381/92; 382/118
See application file for complete search history.

(56) References Cited

U.S. PATENT DOCUMENTS

| | | | |
|---|---|---|---|
| 7,415,117 B2 | 8/2008 | Tashev et al. | |
| 7,567,678 B2 | 7/2009 | Kong et al. | |
| 7,680,667 B2 | 3/2010 | Sonoura et al. | |
| 9,263,044 B1* | 2/2016 | Cassidy | G06K 9/6201 |
| 9,591,427 B1* | 3/2017 | Lyren | G06K 9/00228 |
| 10,419,924 B2* | 9/2019 | Yamaya | H04W 68/00 |
| 10,424,320 B2* | 9/2019 | Shimada | G10L 15/24 |
| 2003/0018475 A1* | 1/2003 | Basu | G06K 9/00228 704/270 |
| 2003/0061032 A1* | 3/2003 | Gonopolskiy | G10L 21/02 704/200.1 |
| 2005/0147258 A1* | 7/2005 | Myllyla | H01Q 3/2611 381/94.2 |
| 2005/0234729 A1 | 10/2005 | Scholl | |
| 2006/0143017 A1 | 6/2006 | Sonoura et al. | |
| 2007/0100630 A1* | 5/2007 | Manabe | G10L 15/24 704/268 |
| 2011/0311060 A1* | 12/2011 | Kim | G10L 19/008 381/17 |
| 2013/0182064 A1* | 7/2013 | Muench | H04N 7/15 379/202.01 |
| 2015/0063589 A1* | 3/2015 | Yu | H04R 3/005 381/92 |
| 2015/0331490 A1 | 11/2015 | Yamada | |
| 2017/0339488 A1* | 11/2017 | Yoshida | G10L 21/0216 |
| 2018/0009107 A1* | 1/2018 | Fujimoto | B25J 9/1664 |
| 2018/0033447 A1* | 2/2018 | Ramprashad | G10L 21/028 |
| 2018/0176680 A1* | 6/2018 | Knight | H04R 1/406 |
| 2018/0285672 A1* | 10/2018 | Yamaya | G06K 9/20 |
| 2018/0286432 A1* | 10/2018 | Shimada | G10L 25/78 |
| 2018/0288609 A1* | 10/2018 | Yamaya | H04W 4/02 |
| 2019/0278294 A1* | 9/2019 | Shimada | G06F 9/3004 |
| 2019/0392840 A1* | 12/2019 | Nakagome | G10L 17/005 |

FOREIGN PATENT DOCUMENTS

| | | |
|---|---|---|
| JP | 2005529421 A | 9/2005 |
| JP | 2006181651 A | 7/2006 |
| JP | 2011191423 A | 9/2011 |
| JP | 2014153663 A | 8/2014 |
| JP | 2017005356 A | 1/2017 |

* cited by examiner

FIG. 5

SOUND SOURCE SEPARATION FOR ROBOT FROM TARGET VOICE DIRECTION AND NOISE VOICE DIRECTION

CROSS-REFERENCE TO RELATED APPLICATIONS

This application is based upon and claims the benefit of priority from the prior Japanese Patent Application No. 2017-123643, filed Jun. 23, 2017, the entire contents of which are incorporated herein by reference.

BACKGROUND OF THE INVENTION

1. Field of the Invention

The present invention relates to a sound source separation information detecting device capable of separating a signal voice from a noise voice, a robot, a sound source separation information detecting method, and a storage medium therefor.

2. Description of the Related Art

There have been known robots each having a form imitating a human or an animal or the like and capable of communicating with a human being by means of a conversation or the like. Some of these robots detect sounds generated around them on the basis of outputs from microphones mounted on the robots and, if determining that the sounds are voices uttered by a target person, the robots turn their faces or bodies to a direction where the target person is present and then make moves such as talking or waving to the target person.

To implement a move of the robot, there is a need for a sound source separation technique of separating only a signal voice uttered by the target person from the sounds generated around the robot by removing unnecessary noise voices (noise sources), which are voices other than the signal voice, therefrom in order to detect a direction or a position of the signal voice (signal source), which is the voice uttered by the target person.

Conventionally, there has been known a technique of performing beam forming, which is a type of sound source separation technique, in order to increase a signal-to-noise ratio (S/N ratio) (for example, Japanese Patent Application Laid-Open No. 2005-253071).

SUMMARY OF THE INVENTION

According to an aspect of the present invention, there is provided a sound source separation information detecting device, including:
a voice acquisition unit having predetermined directivity to acquire a voice;
a first direction detection unit configured to detect a first direction, which is an arrival direction of a signal voice of a predetermined target, from the voice acquired by the voice acquisition unit;
a second direction detection unit configured to detect a second direction, which is an arrival direction of a noise voice, from the voice acquired by the voice acquisition unit; and
a detection unit configured to detect a sound source separation direction or a sound source separation position, based on the first direction and the second direction.

According to another aspect of the present invention, there is provided a robot, including:
the sound source separation information detecting device;
a moving unit configured to move its own device;
an operating unit configured to operate the its own device; and
a control unit configured to control the sound source separation information detecting device, the moving unit, and the operating unit.

According to still another aspect of the present invention, there is provided a sound source separation information detecting method, including the steps of:
detecting a first direction, which is an arrival direction of a signal voice of a predetermined target, from a voice acquired by a voice acquisition unit having predetermined directivity to acquire the voice;
detecting a second direction, which is an arrival direction of a noise voice, from the voice acquired by the voice acquisition unit; and
detecting a sound source separation direction or a sound source separation position, based on the first direction and the second direction.

According to further another aspect of the present invention, there is provided a storage medium configured to store a program causing a computer of a sound source separation information detecting device to function so as to:
detect a first direction, which is an arrival direction of a signal voice of a predetermined target, from a voice acquired by a voice acquisition unit having predetermined directivity to acquire the voice;
detect a second direction, which is an arrival direction of a noise voice, from the voice acquired by the voice acquisition unit; and
detect a sound source separation direction or a sound source separation position, based on the first direction and the second direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain principles of the invention.

FIG. 5 is a diagram illustrating a format example of a labelled face part detection result;

DETAILED DESCRIPTION OF THE INVENTION

Figure 1:
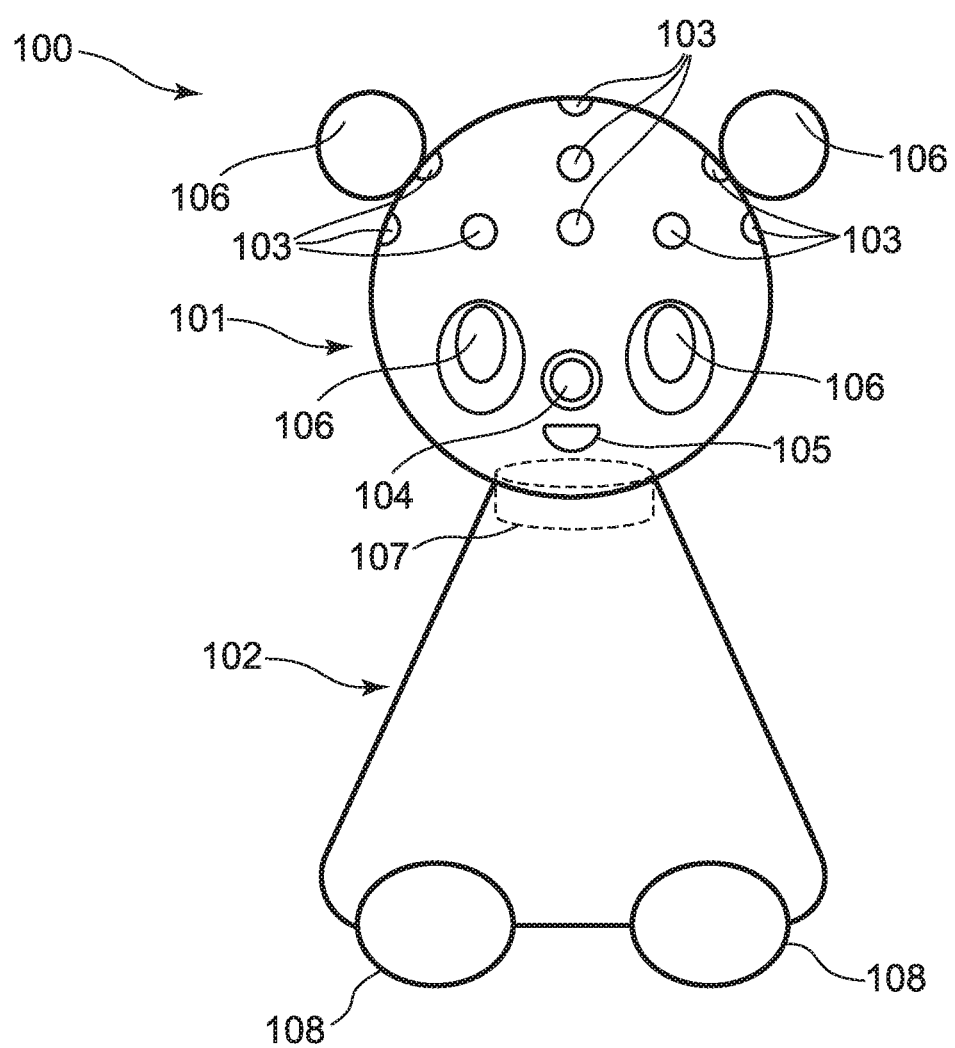
FIG. 1 is an external view of a robot according to an embodiment of the present invention.

Modes for carrying out the present invention will be described in detail below with reference to accompanying drawings. FIG. 1 is a diagram schematically illustrating an appearance of a robot 100 according to an embodiment when viewed from a front. The robot 100 is a humanoid communication robot having a head 101 and a trunk 102. The robot 100 is placed in a house, for example. If the robot 100 is spoken to by a dweller or the like who is a predetermined target (hereinafter, referred to as "target person"), the robot 100 converses with the target person having spoken to the robot 100.

As illustrated in FIG. 1, the head 101 of the robot 100 is provided with a camera 104 (image acquisition unit), a microphone array 103 (voice acquisition unit), a loudspeaker 105 (notification unit), a sensor group 106, a neck joint drive unit 107, and an undercarriage drive unit 108.

The camera 104 is disposed in a lower part of a front surface of the head 101 or in a location of what is called "nose" of a human face. The camera 104 captures an image under the control of a control unit 201 described later.

The microphone array 103 is composed of, for example, 13 microphones. Eight microphones of the 13 microphones are arranged in locations at a height of what is called "forehead" of the human face at regular intervals around a periphery of the head 101. In an upper part of the head 101 above the eight microphones, four microphones are arranged at regular intervals around the head 101. Further, one microphone is arranged at a top of the head 101. The microphone array 103 detects sounds generated around the robot 100.

The loudspeaker 105 is provided lower than the camera 104, that is, in a location of what is called "mouth" of the human face. The loudspeaker 105 outputs various voices under the control of the control unit 201 described later.

The sensor group 106 is provided in locations of what are called "eyes" and "ears" of the human face. The sensor group 106 includes an acceleration sensor, an obstacle detection sensor, and the like, and is used to control a posture of the robot 100 or to secure safety thereof.

The neck joint drive unit 107 is a member which connects the head 101 with the trunk 102. The head 101 is connected to the trunk 102 through the neck joint drive unit 107 indicated by a dashed line. The neck joint drive unit 107 includes a plurality of motors. If the control unit 201 described later drives the plurality of motors, the head 101 of the robot 100 rotates. The neck joint drive unit 107 serves as a face rotation amount acquisition unit, which rotates the head 101 of the robot 100 and acquires a rotation amount thereof.

The undercarriage drive unit 108 serves as a moving unit configured to move the robot 100. Although not particularly illustrated, the undercarriage drive unit 108 includes four wheels provided on the underside of the trunk 102. Two of the four wheels are arranged on a front side of the trunk 102 and the remaining two are arranged on a back side of the trunk 102. As wheels, for example, omni wheels or mecanum wheels are used. The control unit 201 described later causes the wheels of the undercarriage drive unit 108 to rotate so as to move the robot 100.

Figure 2:
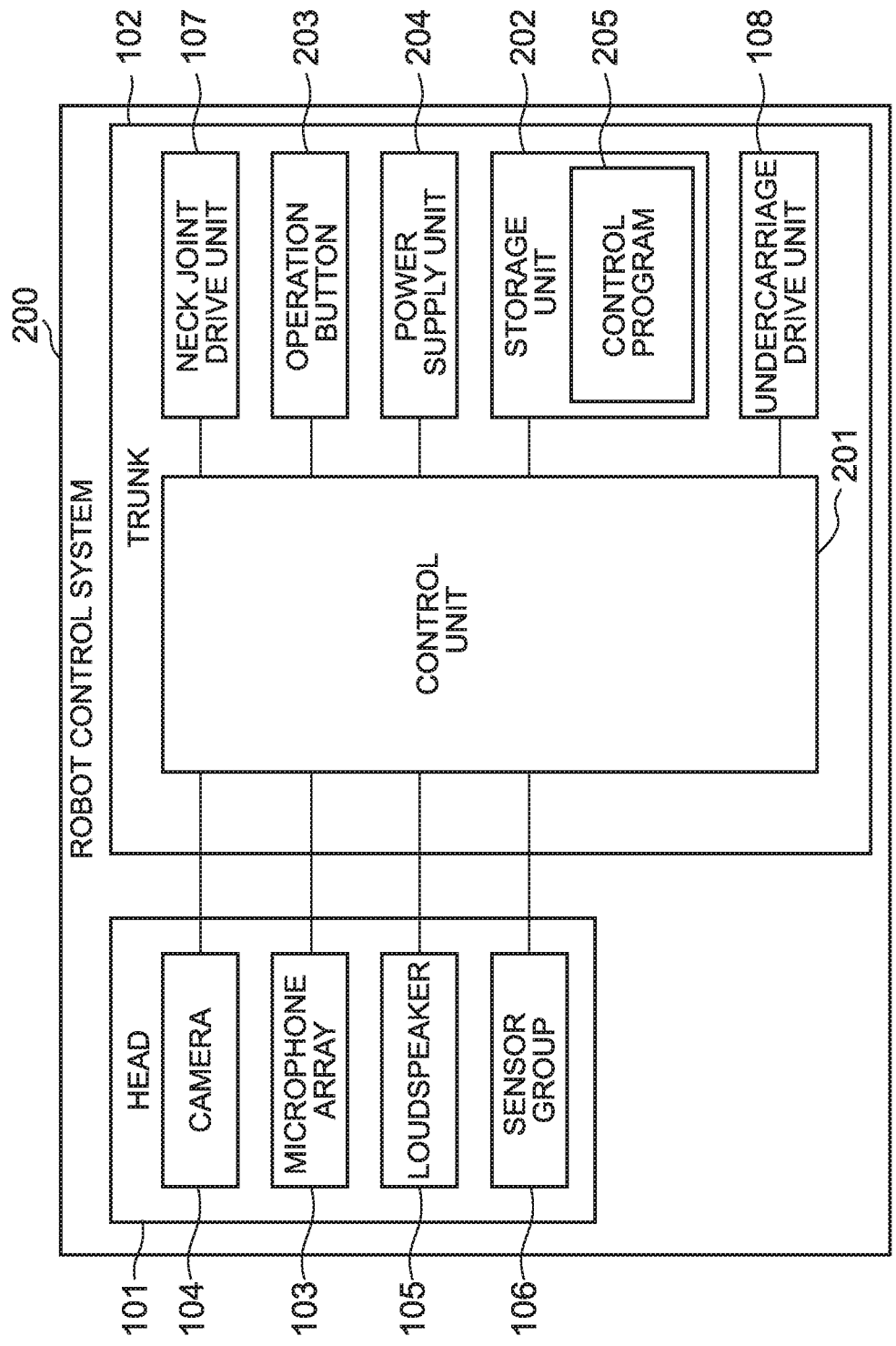
FIG. 2 is a block diagram illustrating a configuration of the robot.

FIG. 2 is a block diagram illustrating a robot control system 200, which is a control system of the robot 100 having the appearance illustrated in FIG. 1. In FIG. 2, parts to which the same reference numbers as in FIG. 1 are appended are the same as those in FIG. 1. In FIG. 2, the control unit 201 placed in the trunk 102 includes a central processing unit (CPU), a random access memory (RAM), and the like. The control unit 201 is electrically connected to each of the microphone array 103, the camera 104, the loudspeaker 105, and the sensor group 106 in the head 101 and to each of the neck joint drive unit 107 and the undercarriage drive unit 108 in the trunk 102 so as to control the respective parts by reading and executing a control program 205 stored in a storage unit 202 described later with the RAM as a work area.

The storage unit 202 includes a solid-state disk drive, a hard disk drive, a flash memory, and the like and is provided in an inside of the trunk 102. The storage unit 202 stores the control program 205 executed by the control unit 201 and various data including voice data collected by the microphone array 103, image data captured by the camera 104, and the like. The control program 205 stored in the storage unit 202 includes a sound source separation information detection program, a movement program, and a dialogue program, and the like described later.

Operation buttons 203 are provided on a back of the trunk 102 (not illustrated in FIG. 1). The operation buttons 203 are various types of buttons for controlling the robot 100, including a power button, a volume control button for the loudspeaker 105, and the like.

A power supply unit 204 is a rechargeable battery built in the trunk 102 and supplies electric power to respective parts of the robot control system 200.

Figure 3:
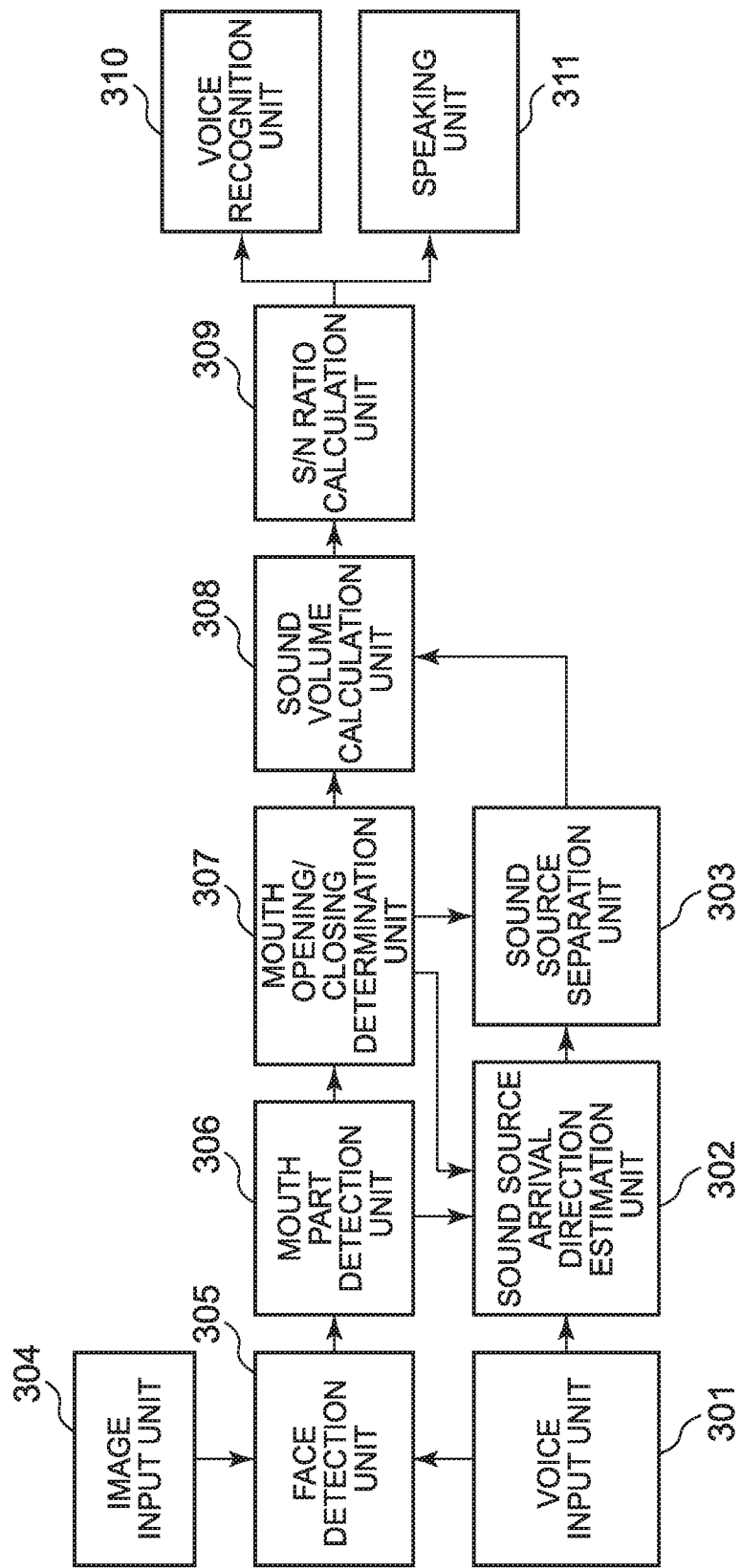
FIG. 3 is a block diagram illustrating a configuration of a robot control function.

FIG. 3 is a block diagram illustrating a configuration of a dialogue function implemented as a part of the function in which the control unit 201 in FIG. 2 executes the control program 205 in the storage unit 202. The respective functional units illustrated in FIG. 3 may be implemented by hardware such as a field programmable array (FPGA) or the like in the control unit 201.

In FIG. 3, a voice input unit 301, which functions as a voice acquisition unit, inputs the voices from the microphones constituting the microphone array 103 in FIG. 1.

An image input unit 304, a face detection unit 305, and a mouth part detection unit 306, which function as image acquisition units, acquire a lips image of the target person, who is a predetermined target, at a timing when the voice input unit 301 acquires the voice. Specifically, the image input unit 304 inputs the image from the camera 104 in FIG. 1. Subsequently, the face detection unit 305 detects a face region from the input image at the timing when the voice input unit 301 inputs a voice having power, for example, equal to or greater than a predetermined threshold value. Then, the mouth part detection unit 306 detects a mouth part from the detected face region and provides it as the lips image.

A mouth opening/closing determination unit 307, which functions as a determination unit, determines whether the lips of the target person are opened or closed on the basis of the lips image output from the mouth part detection unit 306.

A sound source arrival direction estimation unit 302 functions as a first direction detection unit when the mouth opening/closing determination unit 307 determines the opening of the lips (a state in which the lips are opened) and then, assuming that the voice input by the voice input unit 301 is a signal voice, estimates a first direction, which is an arrival direction of the signal voice, on the basis of the lips image output from the mouth part detection unit 306 and the signal voice power of the signal voice.

On the other hand, the sound source arrival direction estimation unit 302 functions as a second direction detection unit when the mouth opening/closing determination unit 307 determines the closure of the lips (a state in which the lips are closed) and then, assuming that a voice input by the voice input unit 301 is a noise voice, estimates a second direction, which is an arrival direction of the noise voice, on the basis of the noise voice power of the noise voice.

The sound source arrival direction estimation unit 302 estimates a sound source localization of the noise voice (the position of a noise source) from a sound source other than the target person by performing processing based on a multiple signal classification (MUSIC) method, which is one of sound source localization techniques, as a processing example in the case of functioning as the second direction detection unit. The details of this processing will be described later.

A sound source separation unit 303 performs arithmetic processing based on a beam forming technique, for example, described in the following Document 1 to perform sound source separation processing in which the signal voice uttered by the target person is emphasized or the noise voice other than the signal voice is suppressed, with the first direction, which is the arrival direction of the signal voice currently obtained by the sound source arrival direction estimation unit 302, or the second direction, which is the arrival direction of the noise voice, as an input.

<Document 1>

Futoshi Asano, "Sound source separation," [online], received on November 2011, "Chishiki-no-mori (Forest of Knowledge)" issued by IEICE, [searched on Jun. 15, 2017], Internet Specifically, if the mouth opening/closing determination unit 307 determines the opening of the lips, the sound source separation unit 303 performs a beam steering operation, in which the signal voice is beam-steered (emphasized) in the first direction currently obtained by the sound source arrival direction estimation unit 302 by the aforementioned beam forming arithmetic processing, to acquire the emphasized signal voice and then outputs the emphasized signal voice to a sound volume calculation unit 308.

On the other hand, if the mouth opening/closing determination unit 307 determines the closing of the lips, the sound source separation unit 303 performs a null steering operation, in which the noise voice is null-steered (suppressed) in the second direction currently obtained by the sound source arrival direction estimation unit 302 by the aforementioned beam forming arithmetic processing, to acquire the suppressed noise voice and then outputs the suppressed noise voice to the sound volume calculation unit 308.

The processing performed by the sound source separation unit 303 may be performed by using physical directivity microphones having predetermined directivity as the microphone array 103.

The sound volume calculation unit 308 calculates the sound volume of the beam-steered (emphasized) signal voice or the null-steered (suppressed) noise voice output from the sound source separation unit 303.

An S/N ratio calculation unit 309 calculates a signal-to-noise ratio (hereinafter, referred to as "S/N ratio") on the basis of the sound volume of the signal voice and the sound volume of the noise voice calculated by the sound volume calculation unit 308 and then determines whether or not the S/N ratio is greater than a threshold value. The sound source separation unit 303, the sound volume calculation unit 308, and the S/N ratio calculation unit 309 function as detection units which detect a sound source separation direction or a sound source separation position on the basis of the first direction and the second direction.

If the S/N ratio is equal to or lower than the threshold value as a result of the determination in the S/N ratio calculation unit 309, the control unit 201 in FIG. 2 determines that the S/N ratio sufficient for voice recognition is not acquired. In this case, the control unit 201 controls, for example, the undercarriage drive unit 108 in FIG. 1 or 2 to move the robot 100 while maintaining a certain relationship (for example, a certain distance, a certain angle, or the like) with the target person.

After moving the robot 100, the control unit 201 activates the robot control function in FIG. 3 again to cause the execution of the determination operation of the S/N ratio similarly to the above. If the S/N ratio calculated by the S/N ratio calculation unit 309 is greater than the threshold value as a result, the control unit 201 in FIG. 2 determines that the S/N ratio sufficient for the voice recognition is acquired and that the position of the robot 100 relative to the target person comes to the sound source separation position, which is an optimized position in which the signal voice is able to be separated from the noise voice most successfully (or determines that the direction of the robot 100 relative to the target person becomes the sound source separation direction, which is the optimized direction in which the signal voice is able to be separated from the noise voice most successfully). In this case, the control unit 201 controls the voice recognition unit 310 in FIG. 3 to perform voice recognition processing for the beam-steered (emphasized) signal voice output from the sound source separation unit 303 to understand the speech content of the target person. Furthermore, in response to the voice recognition result, the control unit 201 has a dialogue with the target person by uttering through the loudspeaker 105 in FIG. 1 or 2 from a speaking unit 311 in FIG. 3 according to a dialogue algorithm.

In FIG. 3, the voice recognition unit 310 performs the voice recognition processing by using a known voice recognition technique. Moreover, the speaking unit 311 performs utterance processing with voice synthesis by using a known voice synthesis technique.

Figure 4:
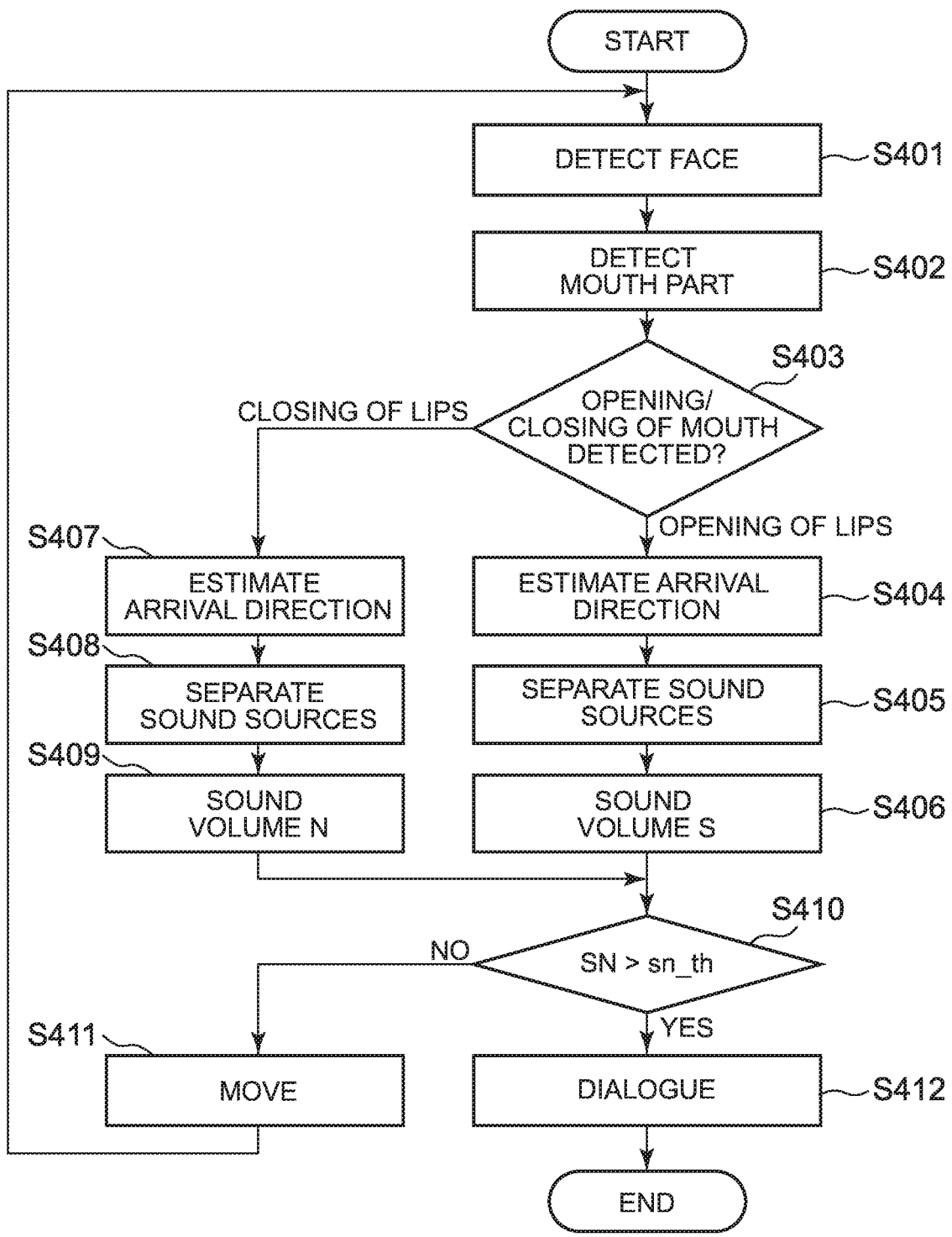
FIG. 4 is a flowchart illustrating a processing example of the configuration of the block diagram in FIG. 3.

FIG. 4 is a flowchart illustrating a processing example of the configuration of the block diagram of FIG. 3. The processing example of the flowchart is implemented as processing performed by hardware of the control unit 201 that implements the configuration of the block diagram of FIG. 3 or as processing of the control program 205 performed by the control unit 201 in FIG. 2.

First, the face detection unit 305 in FIG. 3 performs face detection processing (step S401). In this face detection processing, a face region is detected from an image input through the image input unit 304 from the camera 104 at the timing when the voice input unit 301 inputs the voice, for example, having power equal to or greater than a predetermined threshold value. For the face detection processing, a known face detection technique may be used. For example, any one of the face detection techniques described in the following Document 2 is applicable.

<Document 2>

Kazuhiro Hotta, "Special Issue: Face Recognition Technique, 1. Research Tendency of Face Recognition," [online], published on Mar. 28, 2012, The journal of The Institute of Image Information and Television Engineers, Vol. 64, No. 4(2010), pp. 459 to 462, [Searched on Jun. 15, 2017], Internet Subsequently, the mouth part detection unit 306 in FIG. 3 performs mouth part detection processing (step S402). For the mouth part detection processing, a known face part detection technique may be used. For example, any one of the face part detection techniques described in the following Document 3 is applicable.

<Document 3> littlewing, "Summary of face recognition techniques available in Web camera-2," [online], published on Apr. 7, 2015, [searched on Jun. 15, 2017], Internet The mouth part detection processing in step S402 enables an acquisition of face part detection results, which are labelled coordinate values, first, for example. As a format example of the labelled face part detection results, an example described as FIG. 2 in the following Document 4, for example, may be used as illustrated in FIG. 5.

<Document 4>

Figure 5:
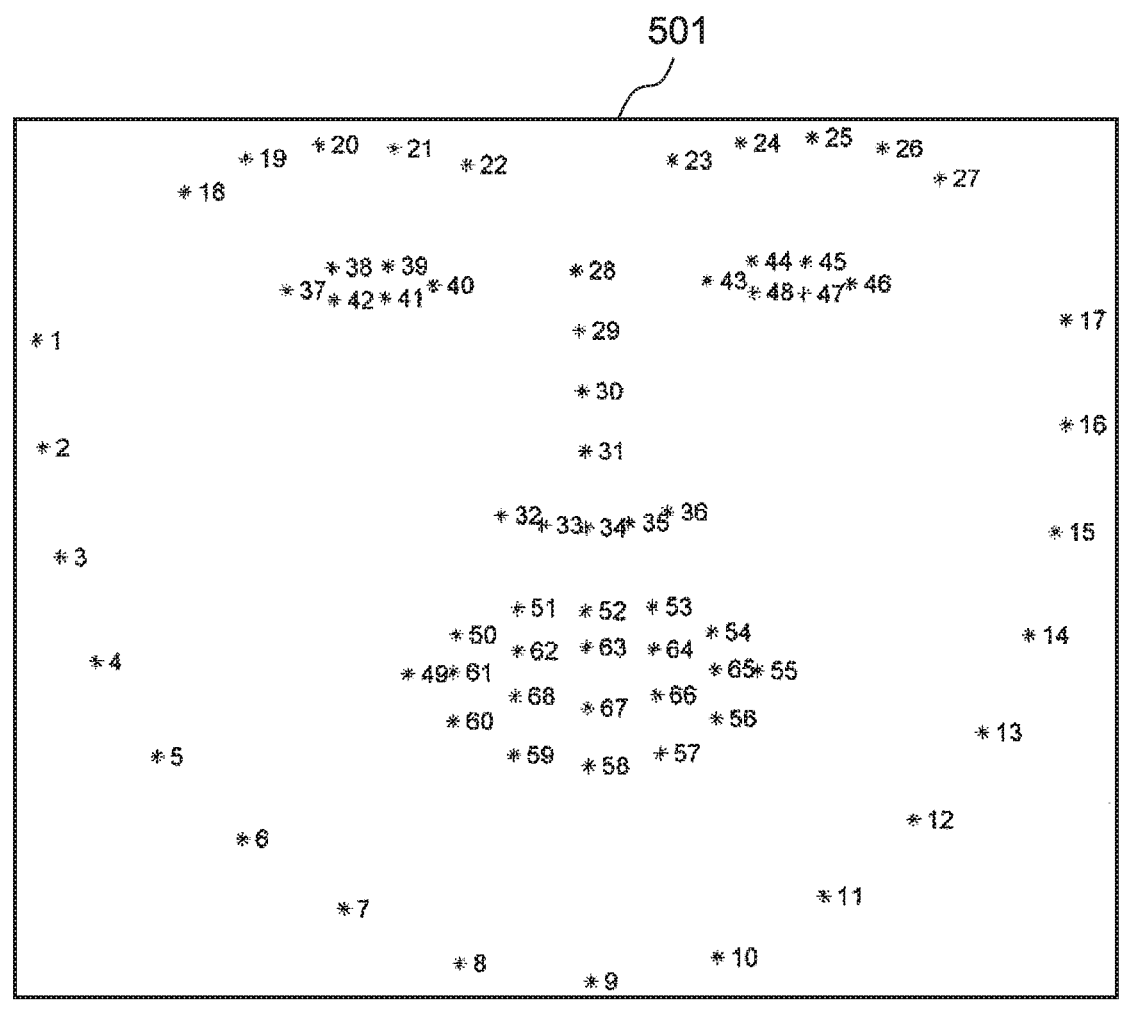

C. sagonas, "Facial point annotations," [online], [searched on Jun. 15, 2017], Internet In the mouth part detection processing of step S402, for example, labels 49 to 68 are detected as a mouth part and labels 28 to 36 are detected as a nose part, out of the face part detection results illustrated in FIG. 5.

Subsequently, the mouth opening/closing determination unit 307 in FIG. 3 performs mouth opening/closing detection processing for detecting the opening of the lips (whether the lips are opened) or the closing of the lips (whether the lips are closed) by using labelled coordinate values (for example, the labels 49 to 68 and the labels 28 to 36 in FIG. 5, for example) of the mouth part and the nose part calculated in step S402 (step S403).

In step S403, the mouth opening/closing determination unit 307, first, calculates a change $\Delta y$ in the ordinate (the vertical direction of the face) of the lips. At the present moment, a y coordinate amount difference sum y(t) is calculated in a frame F(t) at a certain time by an arithmetic operation of the following expression (1).

$$y(t)=yy1+yy2 \quad (1)$$

In the expression (1), yy1 represents the y coordinate amount difference sum between the upper lip (lower part) and the lower lip (upper part) and is calculated by an accumulation operation of the following expressions (2) to (7) according to the relationship in FIG. 5. In these expressions, an arithmetic operation "+=" represents an arithmetic operation in which a right-hand value is accumulated on a left-hand value. Moreover, a function "f abs( )" is a function in which the absolute value of the numerical value in parentheses is calculated using a floating-point number. Furthermore, for example, "data.y[61](t)" indicates a y-coordinate data value of label 61 in FIG. 5 in the frame image F(t) at time t. The same applies to others.

$$yy1+=f\,abs(data.y[61](t)-data.y[67](t)) \quad (2)$$

$$yy1+=f\,abs(data.y[61](t)-data.y[58](t)) \quad (3)$$

$$yy1+=f\,abs(data.y[62](t)-data.y[66](t)) \quad (4)$$

$$yy1+=f\,abs(data.y[62](t)-data.y[57](t)) \quad (5)$$

$$yy1+=f\,abs(data.y[63](t)-data.y[65](t)) \quad (6)$$

$$yy1+=f\,abs(data.y[63](t)-data.y[56](t)) \quad (7)$$

In expression (1), yy2 represents the y coordinate amount difference sum between the under-nose part and the lower lip (upper part) and is calculated by the arithmetic operation of the following expressions (8) to (12) according to the relationship in FIG. 5.

$$yy2+=f\,abs(data.y[31](t)-data.y[60](t)) \quad (8)$$

$$yy2+=f\,abs(data.y[32](t)-data.y[61](t)) \quad (9)$$

$$yy2+=f\,abs(data.y[33](t)-data.y[62](t)) \quad (10)$$

$$yy2+=f\,abs(data.y[34](t)-data.y[63](t)) \quad (11)$$

$$yy2+=f\,abs(data.y[34](t)-data.y[64](t)) \quad (12)$$

In step S403 of FIG. 4, the mouth opening/closing determination unit 307 subsequently finds a difference absolute value $\Delta y$ between the y coordinate amount difference sum y(t) calculated by the arithmetic operation of the expression (1) for the frame image F(t) at time t and the y coordinate amount difference sum y(t−1) calculated by the same arithmetic operation as the expression (1) for a frame image F(t−1) at a time (t−1) which is one frame earlier, by using the following expression (13). Incidentally, the function "abs( )" is a function in which the absolute value of the numerical value in parentheses is calculated using an integer.

$$\Delta y=abs(y(t)-y(t-1)) \quad (13)$$

The value $\Delta y$ calculated by the expression (13) represents the moving amount of the lips and increases when the upper lip and the lower lip move in a direction away from or approaching each other. In other words, the mouth opening/closing determination unit 307 operates as a lips moving amount acquisition unit.

In step S403 of FIG. 4, the mouth opening/closing determination unit 307 also calculates a change $\Delta x$ in the abscissa (the right and left direction of the face) of the lips in the same arithmetic operation as in the above $\Delta y$.

In other words, an x coordinate amount difference sum x(t) is now calculated by the arithmetic operation of the following expression (14) in the frame F(t) at a certain time. In the expression (14), for example, "data.x[61](t)" represents an x coordinate data value of label 61 in FIG. 5 in the frame image F(t) at time t. The same applies to others.

$$x(t)=data.x[61](t)+data.x[62](t)+data.x[63](t)+data.x[67](t)+data.x[66](t)+data.x[65](t) \quad (14)$$

Subsequently, the expression (15) described below is used to calculate a difference absolute value $\Delta x$ between the x coordinate amount difference sum x(t) calculated by the arithmetic operation of the expression (14) for the frame image F(t) at time t and the x coordinate amount difference sum x(t−1) calculated by the same arithmetic operation as that of the expression (14) for the frame image F(t−1) at the time (t−1), which is one frame earlier than the time t.

$$\Delta x=abs(x(t)-x(t-1)) \quad (15)$$

The $\Delta x$ value calculated by the expression (15) indicates the moving amount of the lips similarly to the value $\Delta y$ and increases when the lips are moving either to the right or the left. Also in this case, the mouth opening/closing determination unit 307 operates as the lips moving amount acquisition unit.

In step S403 of FIG. 4, the mouth opening/closing determination unit 307 subsequently performs rotation determination of the head 101 in FIG. 1. The mouth opening/closing determination unit 307 calculates the differences in the head posture Δroll, Δyaw, and Δpitch between the frame image F(t) at the frame time t and the frame image F(t−1) at the frame time (t−1), which is one frame earlier than the frame time t, on the basis of the signal input from the neck joint drive unit 107 in FIG. 1 or 2 to the control unit 201 by the following expressions (16), (17) and (18).

$$\Delta roll = abs(F(t)roll - F(t-1)roll) \quad (16)$$

$$\Delta yaw = abs(F(t)yaw - F(t-1)yaw) \quad (17)$$

$$\Delta pitch = abs(F(t)pitch - F(t-1)pitch) \quad (18)$$

Figure 6:
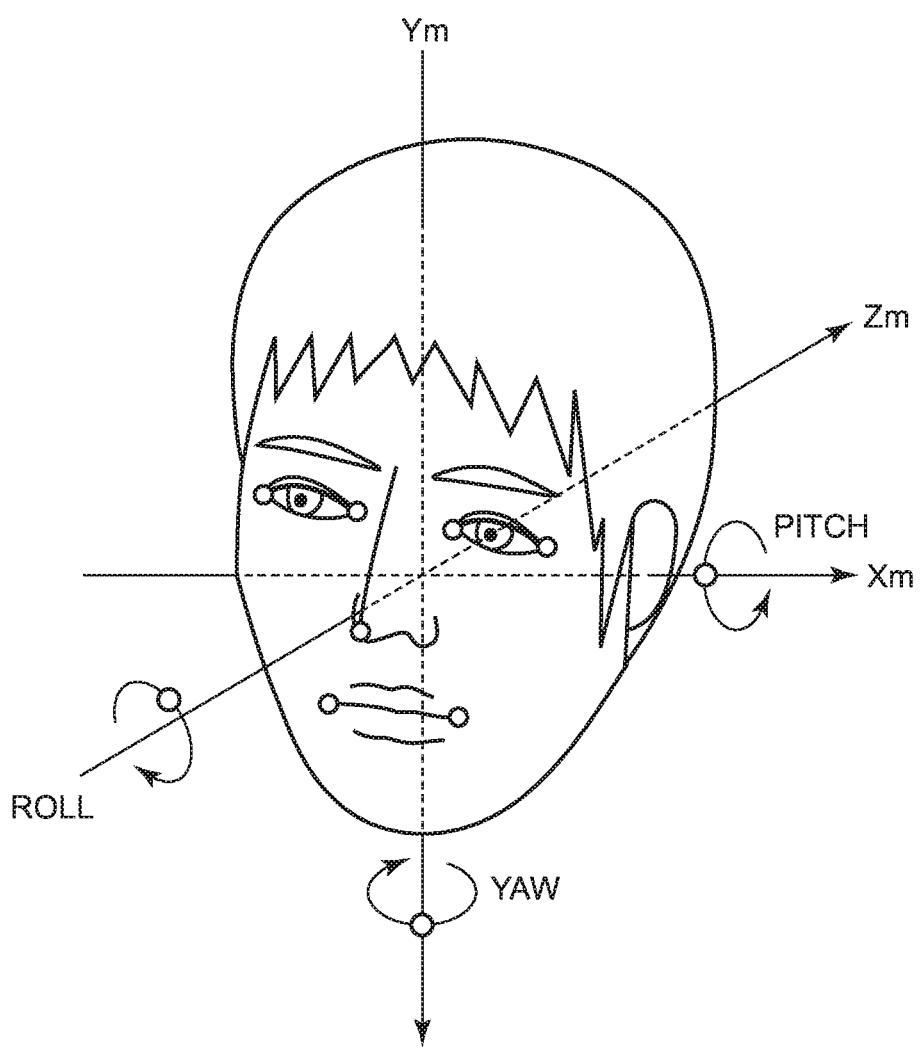
FIG. 6 is a diagram exemplifying a degree of freedom in rotation of a head.

Incidentally, for example, F(t)roll is a roll angle value, which is input from the neck joint drive unit 107 in FIG. 1 or 2 to the control unit 201 so as to correspond to the frame image F(t) at the time t, and F(t−1)roll is the roll angle value, which is input from the neck joint drive unit 107 in FIG. 1 or 2 to the control unit 201 so as to correspond to the frame image F(t−1) at the time (t−1). The same applies to the yaw angle values F(t)yaw and F(t−1)yaw and to the pitch angle values F(t)pitch and F(t−1)pitch. FIG. 6 is a diagram exemplifying a degree of freedom in rotation of the head 101 of the robot 100 in FIG. 1. The neck joint drive unit 107 in FIG. 1 or 2 enables the rotation of the head 101 of the robot 100 around a pitch axis Xm, around a roll axis Zm, and around a yaw axis Ym relative to the trunk 102. The neck joint drive unit 107 outputs a pitch angle value around the pitch axis Xm, a roll angle value around the roll axis Zm, and a yaw angle value around the yaw axis Ym to the control unit 201 as described above.

In step S403 of FIG. 4, the mouth opening/closing determination unit 307 calculates a roll angle difference value Δroll, a yaw angle difference value Δyaw, and a pitch angle difference value Δpitch as rotation angles of the head 101 as results of the arithmetic operations of the above expressions (16), (17), and (18). In this case, the mouth opening/closing determination unit 307 operates as a lips rotation amount acquisition unit configured to acquire the rotation amount of the head 101 or the lips image.

As methods of estimating the rotation angle of the head 101, various methods are known and a technique other than the above may be employed.

In step S403 of FIG. 4, the mouth opening/closing determination unit 307 performs the opening/closing determination of the lips according to the rules described below, on the basis of the roll angle difference value Δroll, the yaw angle difference value Δyaw, and the pitch angle difference value Δpitch as the ordinate change Δy, the abscissa change Δx, and the rotation angle of the head 101 of the robot 100, as described above, according to the rules described below. Specifically, the mouth opening/closing determination unit 307 determines the opening of the lips (a state in which the lips are opened) if the conditions indicated by the logical expressions in the following (19) are satisfied and determines the closing of the lips (a state in which the lips are closed) unless the conditions are satisfied. In the expression (19), a first threshold value y_th, a second threshold value x_th, and third threshold values roll_th, yaw_th, and pitch_th are determination threshold values of Δy, Δx, Δroll, Δyaw, and Δpitch, respectively, and && is a logical conjunction in programming language.

Specifically, the mouth opening/closing determination unit 307 determines the opening of the lips if the upper lip and the lower lip move in a direction away from or approaching each other, the moving amount of the lips in the horizontal direction is small, and the head 101 of the robot 100 does not rotate so much. The use of not only Δy, but also Δx, Δroll, Δyaw, and Δpitch for the opening/closing determination of the lips enables erroneous determination to be unlikely to occur even in an action of disapproval (shaking the head from side to side) or of inclining the head for thinking.

Returning to the description of FIG. 4, if the mouth opening/closing determination unit 307 determines the opening of the lips by the series of processes in the above step S403, a series of processes of subsequent steps S404 to S406 are performed.

First, the sound source arrival direction estimation unit 302 in FIG. 3 performs processing of calculating a lips inclination angle S_ang relative to (the camera 104 of) the robot 100 on the basis of the lips inclination of the face image (=the lips image) detected by the face detection unit 305 of FIG. 3 as the estimation processing of the arrival direction of the signal voice (step S404).

Subsequently, the sound source separation unit 303 in FIG. 3 performs the beam steering operation in which the beam steering (emphasizing) is performed in the direction of the lips inclination angle S_ang (first direction) calculated in step S404 through the beam forming arithmetic processing described in the aforementioned Document 1, for example, to obtain the emphasized signal voice (step S405).

Thereafter, the sound volume calculation unit 308 in FIG. 3 calculates a sound volume $S_{pow}$ of the beam-steered (emphasized) signal voice obtained in step S405 (step S406).

On the other hand, if the mouth opening/closing determination unit 307 determines the closing of the lips through the series of processes in step S403, a series of processes of subsequent steps S407 to S409 are performed.

First, the sound source arrival direction estimation unit 302 in FIG. 3 performs processing based on the MUSIC method, which is the sound source localization technique, to estimate the sound source localization of the noise voice (the position of the noise source) from the sound source other than the target person to perform processing of determining a noise direction angle N_ang (step S407). The details of this processing will be described later.

Subsequently, the sound source separation unit 303 in FIG. 3 performs a null steering operation in which null steering (suppressing) is performed in a direction of the noise direction angle N_ang (second direction) calculated in step S407 through the beam forming arithmetic processing described in the aforementioned Document 1, for example, to obtain the suppressed noise voice (step S408).

The sound volume calculation unit 308 in FIG. 3 then calculates a sound volume $N_{pow}$ of the null-steered (suppressed) noise voice obtained in step S408 (step S409).

Thereafter, the S/N ratio calculation unit 309 in FIG. 3 calculates the S/N ratio according to the arithmetic operation of the following expression (20) on the basis of the sound volume $S_{pow}$ of the signal voice calculated in step S406 and the sound volume $N_{pow}$ of the noise voice calculated in step S409.

$$S/N \text{ ratio} = S_{pow}/N_{pow} \quad (20)$$

Furthermore, the S/N ratio calculation unit 309 determines whether or not the calculated S/N ratio is greater than a threshold value sn_th according to a determination operation of the following expression (21) (step S410).

$$S/N \text{ ratio} > sn\_th \quad (21)$$

If the determination in step S410 is NO, the control unit 201 in FIG. 2 determines that the sufficient S/N ratio for voice recognition is not obtained. If so, the control unit 201 controls, for example, the undercarriage drive unit 108 in FIG. 1 or 2 to move the robot 100 while maintaining a certain relationship (for example, a certain distance, a certain angle, or the like), for example, relative to the target person (step S411). The details of moving processing will be described later.

After the moving of the robot 100, a series of control processes of steps S401 to S409 in FIG. 4 are performed and then the determination of the S/N ratio of step S410 is performed again.

If the determination of step S410 is YES in due course, the control unit 201 in FIG. 2 determines that a sufficient S/N ratio for voice recognition is obtained and the positional relationship of the robot 100 relative to the target person satisfies the sound source separation position, which is the optimized position where the signal voice can be separated from the noise voice most successfully. In this case, the control unit 201 causes the voice recognition unit 310 in FIG. 3 to perform the voice recognition processing for the beam-steered (emphasized) signal voice output from the sound source separation unit 303 to understand the speech content of the target person. Furthermore, the control unit 201 dialogues with the target person by uttering through the loudspeaker 105 in FIG. 1 or 2 from the speaking unit 311 in FIG. 3 according to the dialogue algorithm in response to the voice recognition result (the above is in step S412). After the completion of the dialogue, the control unit 201 in FIG. 2 ends the control processing illustrated in the flowchart of FIG. 4.

Figure 7:
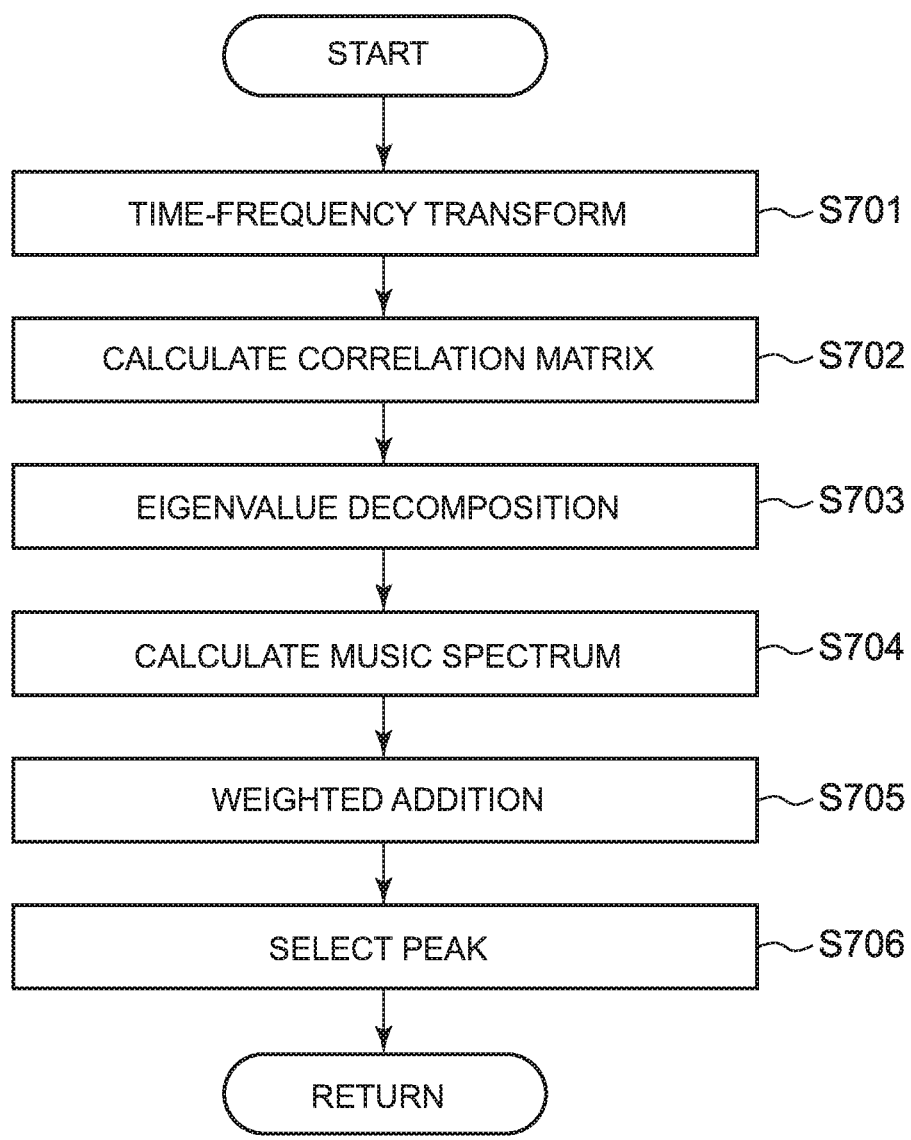
FIG. 7 is a flowchart illustrating an example of sound source arrival direction estimation processing of a noise voice.

FIG. 7 is a flowchart illustrating a detailed example of processing of estimating the sound source localization of the noise voice (the position of the noise source) from the sound source other than the target person and determining the noise direction angle N_ang, which is performed on the basis of the MUSIC method by the sound source arrival direction estimation unit 302 in FIG. 3 in step S407, if the mouth opening/closing determination unit 307 determines the closing of the lips through the series of processes in step S403 of FIG. 4.

First, a voice input to the microphone array 103 in FIG. 1 or 2 is time-frequency transformed (step S701). In this specification, for example, a short-time Fourier transform (SIFT) is performed as time-frequency transform arithmetic processing.

Assuming that N is the number of sound sources, a signal Sn of an n-th sound source is able to be expressed by the following expression (22), where ω is an angular frequency and f is a frame number (the same applies to the following description).

$$Sn(\omega, f)(n=1,2,\ldots,N) \tag{22}$$

The signal observed by each microphone of the microphone array 103 in FIG. 1 or 2 is able to be expressed by the following expression (23), where M is the number of microphones in the microphone array 103.

$$Xm(\omega, f)(m=1,2,\ldots,M) \tag{23}$$

The sound issued from the sound source travels through air and is observed by the microphones of the microphone array 103. Assuming that a transfer function is Hnm(ω) at that time, the signal observed by the microphones of the microphone array 103 can be found by multiplying the expression which expresses the signal of the sound source by the transfer function. A signal Xm(ω, f) observed by an m-th microphone can be expressed by the following expression (24).

$$X_m(\omega, f) = \sum_{n=1}^{N} S_n(\omega, f) H_{nm}(\omega) \tag{24}$$

The robot 100 has a plurality of microphones as the microphone array 103, and therefore a signal x(ω, f) observed by the entire microphone array 103 can be expressed by the following expression (25).

$$x(\omega, f) = \begin{bmatrix} X_1(\omega, f) \\ X_2(\omega, f) \\ \vdots \\ X_M(\omega, f) \end{bmatrix} \tag{25}$$

Similarly, also a signal s(ω, f) of the entire sound source can be expressed by the following expression (26).

$$s(\omega, f) = \begin{bmatrix} S_1(\omega, f) \\ S_2(\omega, f) \\ \vdots \\ S_N(\omega, f) \end{bmatrix} \tag{26}$$

Similarly, a transfer function hn(ω) of an n-th sound source can be expressed by the following expression (27).

$$h_n(\omega) = \begin{bmatrix} H_{n1}(\omega) \\ H_{n2}(\omega) \\ \vdots \\ H_{nM}(\omega) \end{bmatrix} \tag{27}$$

All transfer functions are denoted by the following expression (28).

$$h(\omega) = [h1(\omega), h2(\omega), \ldots hN(\omega)] \tag{28}$$

If the transfer function expressed by the expression (28) is applied to the aforementioned expression (24), the transfer function can be expressed by the following expression (29).

$$x(\omega, f) = h(\omega) s(\omega, f) \tag{29}$$

The transfer function hn(ω) is independent for each sound source position and Sn(ω, f) is able to be considered to be uncorrelated in terms of a certain number of frames (for example, L is assumed to indicate the number of frames). Therefore, x(ω, f) constitutes a hyperplane in which the number of sound sources N is RANK. At this time, the distribution tends to spread in a direction of a transfer function whose sound source has a great sound volume which has been normalized by the distance. Accordingly, it will now be discussed that the space is decomposed into a subspace and a null space.

Referring to FIG. 7 again, a correlation matrix is calculated as expressed by the following expression (30) (step S702), where the superscript "*" indicates complex conjugate transposition.

$$R(\omega, f) = \sum_{l=0}^{L-1} x(\omega, f+1)x^*(\omega, f+1) \quad (30)$$

Subsequently, eigenvalue decomposition is performed (step S703). In this process, it is assumed that an eigenvalue $\lambda m (\omega, f)$ and an eigenvector $em(\omega, f)$ are rearranged in such a way that the eigenvalues are arranged in descending order.

In principle, the transfer function $hn(\omega)$ is able to be restored from a weighted addition of the eigenvector $em(\omega, f)(m=1 \text{ to } N)$ of the subspace. The restoration, however, is actually difficult and therefore the sound source localization is achieved by utilizing that the eigenvector $em(\omega, f)(m=N+1 \text{ to } M)$ constituting the null space is orthogonal to the transfer function $hn(\omega)$.

Since the sound source of the noise voice, however, is likely to move in, for example, a room of a building, the sound source position cannot be previously known and therefore it is difficult to acquire the transfer function of the sound source position in advance. Therefore, a provisional sound source position is determined and then a transfer function of the provisional sound source position is previously prepared to perform the sound source localization.

Figure 8:
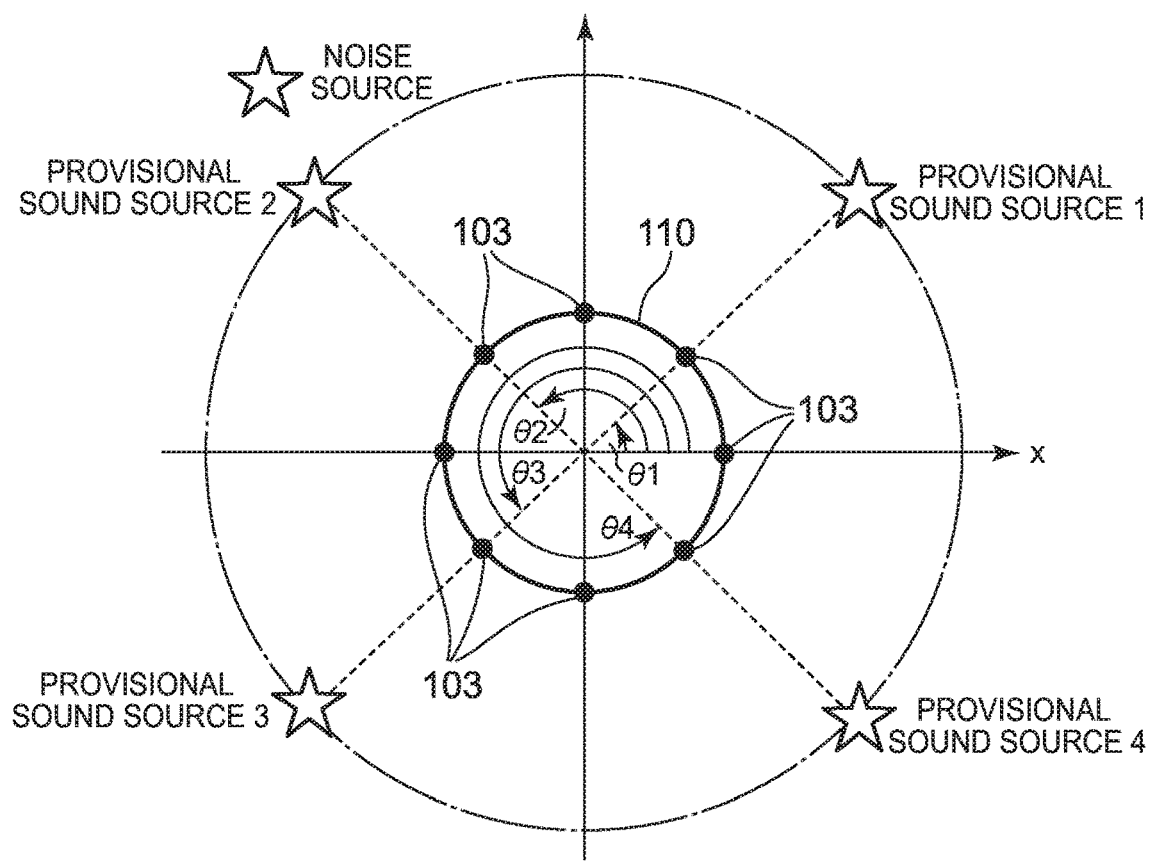
FIG. 8 is a diagram illustrating an example of provisional sound source positions and an arrangement of microphones.

FIG. 8 is a diagram illustrating an example of provisional sound source positions and an arrangement of microphones. In FIG. 8, a thick line circle represents the head 110 of the robot 100 and black circles on the thick line represent microphones of the microphone array 103. In this diagram, all of the 13 microphones of the microphone array 103 in FIG. 1 are not illustrated for convenience. It is assumed that four provisional sound source positions are present around the robot 100.

Since the plurality of microphones of the microphone array 103 are arranged on the head 110 of the robot 100, the microphones can be considered to be arranged along the circumference. Assuming that θ1, θ2, θ3, and θ4 indicate angles between the positive direction of the X axis and the respective lines connected from the center of the circle formed by the microphones (corresponding to the center position of the head 110 of the robot 100) to the provisional sound sources 1 to 4 respectively, the respective transfer functions $h\theta(\omega)$ are calculated in advance.

Although description has been made by giving an example in which four sound sources are used in FIG. 8, respective transfer functions $h\theta(\omega)$ of θ1, θ2, - - -, and θN are calculated in advance in the case of N sound sources as the number thereof. Alternatively, the transfer functions may be calculated in advance on the basis of geometric information, instead of preparing the transfer functions of the provisional sound source positions.

Referring to FIG. 7 again, a MUSIC spectrum for each frequency band is calculated by using the following expression (31) (step S704).

$$M_\theta(\omega, f) = \frac{h_\theta^*(\omega)h_\theta(\omega)}{\sum_{m=N+1}^{M} |h_\theta^*(\omega)e_m(\omega, f)|^2} \quad (31)$$

In the above, the denominator of the expression (31) cannot be zero due to a noise, an error, an influence of a signal leakage between frequency bands in SIFT, or the like. In addition, if the direction of the sound source is close to any one of the predetermined angles θ (θ1, θ2, - - -, θN), in other words, if $hn(\omega)$ is close to $h\theta(\omega)$, the value of the expression (31) is extremely large. In the example illustrated in FIG. 8, the sound source of the noise voice is close to the position of the provisional sound source. Therefore, if the transfer function of θ2 is used, it is supposed that the value of the expression (31) is extremely large.

Subsequently, to find the integrated MUSIC power, weighted addition is applied to the MUSIC spectrum for each frequency band by the arithmetic operation expressed by the following expression (32) (step S705).

$$M(f) = \sum_\omega w(\omega)M(\omega, f) \quad (32)$$

The weighting coefficient is also able to be calculated according to power included in $Sn(\omega, f)$ if it is set to be larger as the eigenvalue $\lambda m(\omega, f)$ is larger. In this case, it is possible to reduce adverse effect in the case of little power in $Sn(\omega, f)$.

At the end, an appropriate peak (maximum value) is selected from the power spectrum (step S706). Specifically, first, a plurality of peaks is calculated, an appropriate peak is selected out of the peaks, and θ of the selected peak is assumed to be the noise direction angle N_ang of the sound source direction of the noise voice described in step S407 of FIG. 4. Incidentally, the peak is found based on the following reason: the power of θ in the original sound source direction is not necessarily largest, but the power of θ close to the original sound source direction is generally large and therefore a correct sound source direction is acquired from any one of the plurality of peaks. Thereafter, the processing of the flowchart of FIG. 7 ends and then the sound source arrival direction estimation processing of the noise voice in step S407 of FIG. 4 ends.

Although the above description has been made by assuming a plane for the sound source arrival direction of the noise voice, the above description is also applicable even if a three-dimensional space is assumed.

Figure 9:
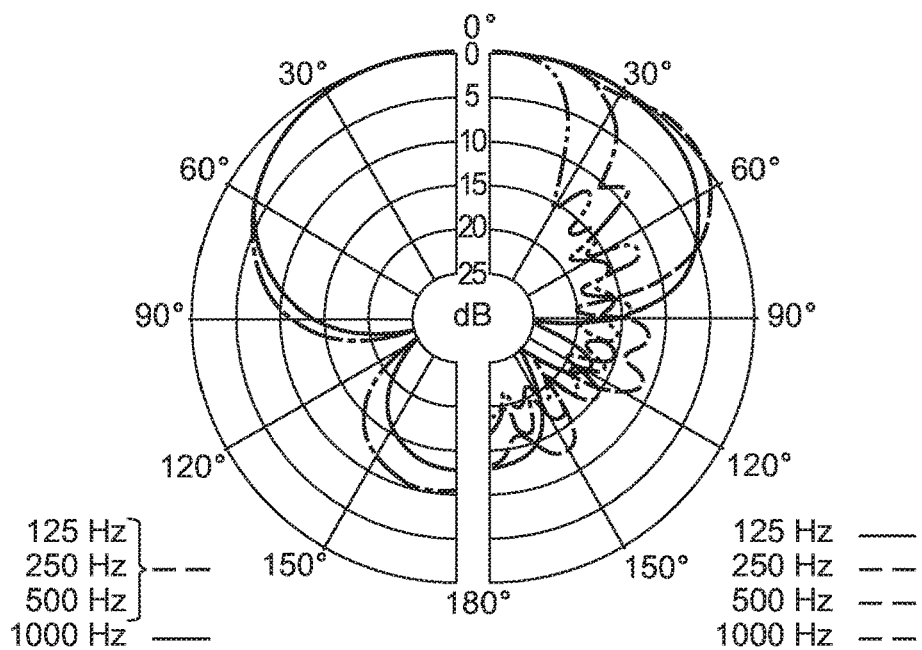
FIG. 9 is a diagram illustrating an example of directivity characteristics of a microphone array.

FIG. 9 is a diagram illustrating an example of the directivity characteristics of the microphone array 103 in FIG. 1 or 2, and FIGS. 10 to 12 are explanatory diagrams for detecting the sound source separation direction. In FIG. 9, the microphone array 103 evenly obtains negative gains at the respective frequencies around 120 degree. Therefore, the direction in which the best sound source separation can be expected is the sound source separation direction in which the absolute value of a difference between the signal voice direction S_ang of the target person, which is the lips inclination angle, calculated in step S404 of FIG. 4 and the noise direction angle N_ang calculated in step S407 as expressed by the following expression (33) is around 120 degrees.

$$\text{abs}(S\_ang - N\_ang) \quad (33)$$

As the algorithm implemented by processing performed in step S410 of FIG. 4, where the result of determination is NO, and proceeding to step S411, and then returning to S401, the moving processing of the robot 100 in step S411 of FIG. 4 described above is repeated while it is determined whether or not the S/N ratio of the signal voice to the noise voice calculated according to the aforementioned expression (20) exceeds the threshold value sn_th by the determination operation of the aforementioned expression (21) for each position of the robot 100, and a point where the S/N ratio is determined to exceed the threshold value sn_th is considered to be the optimal separation position between the signal voice and the noise voice, in other words, the sound source separation position.

Alternatively, it is also possible to consider a point where the S/N ratio rises up to the highest level after exceeding the threshold value as the sound source separation position, instead of the point where the S/N ratio exceeds the threshold value sn_th.

Figure 10:
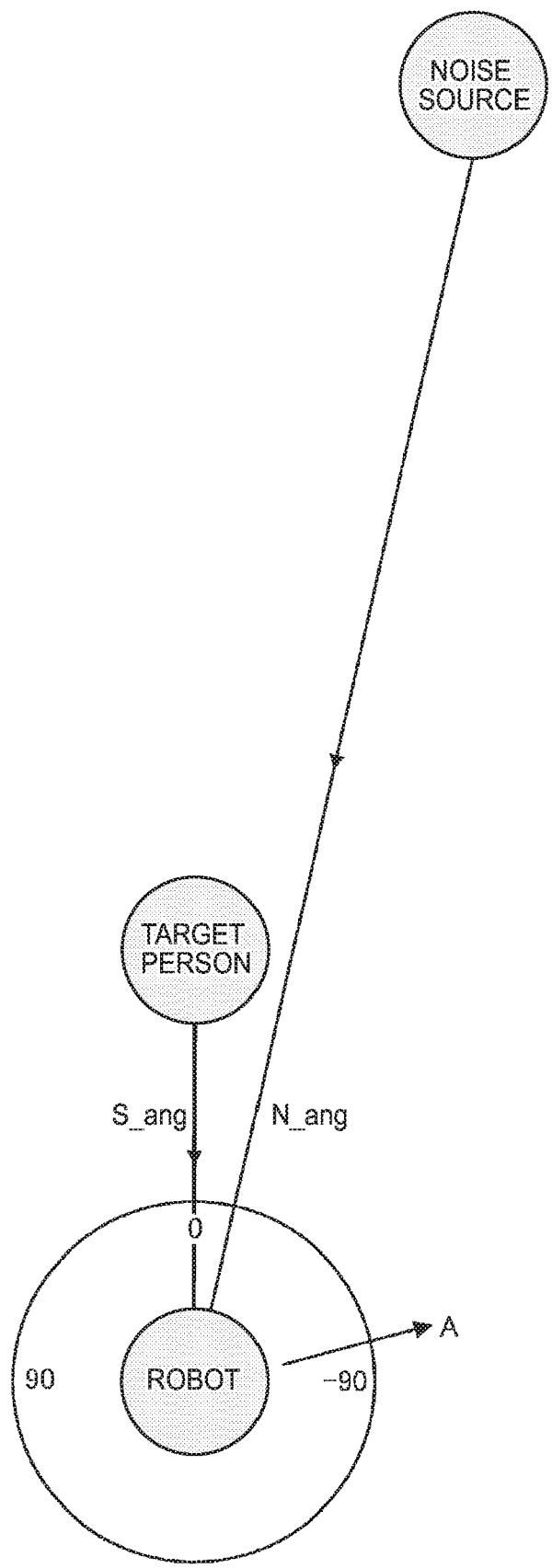
FIG. 10 is an explanatory diagram (1) of the sound source separation information detection.
Figure 11:
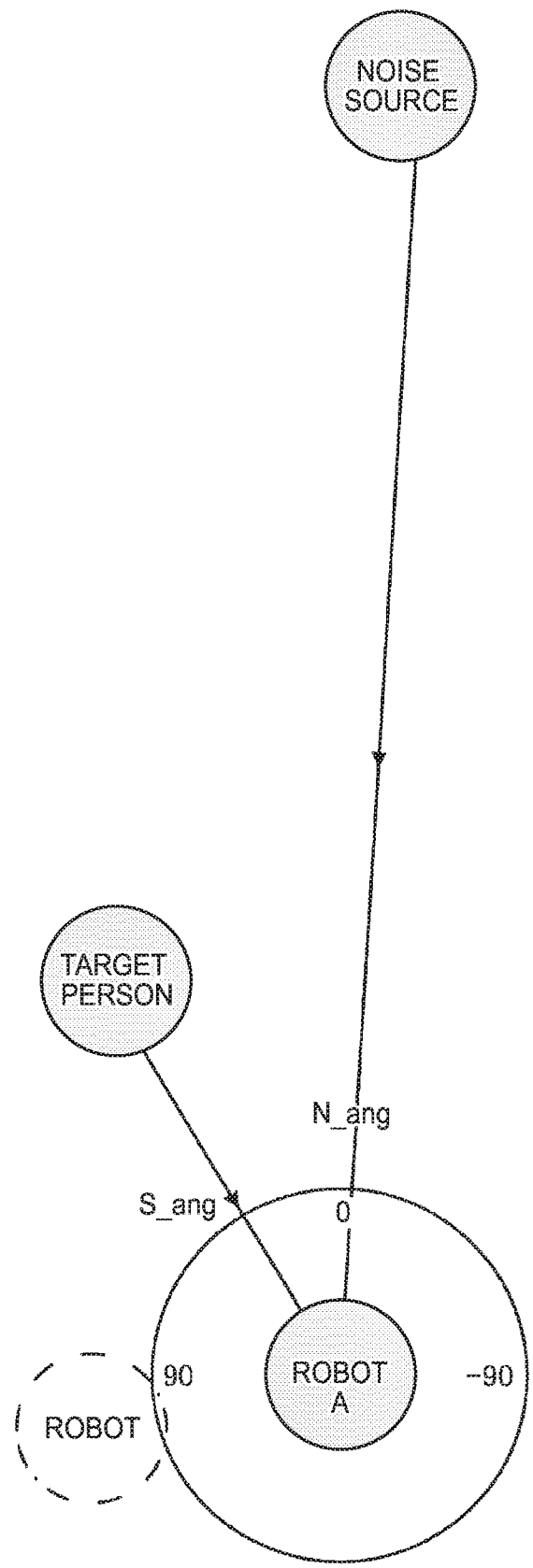
FIG. 11 is an explanatory diagram (2) of the sound source separation information detection.
Figure 12:
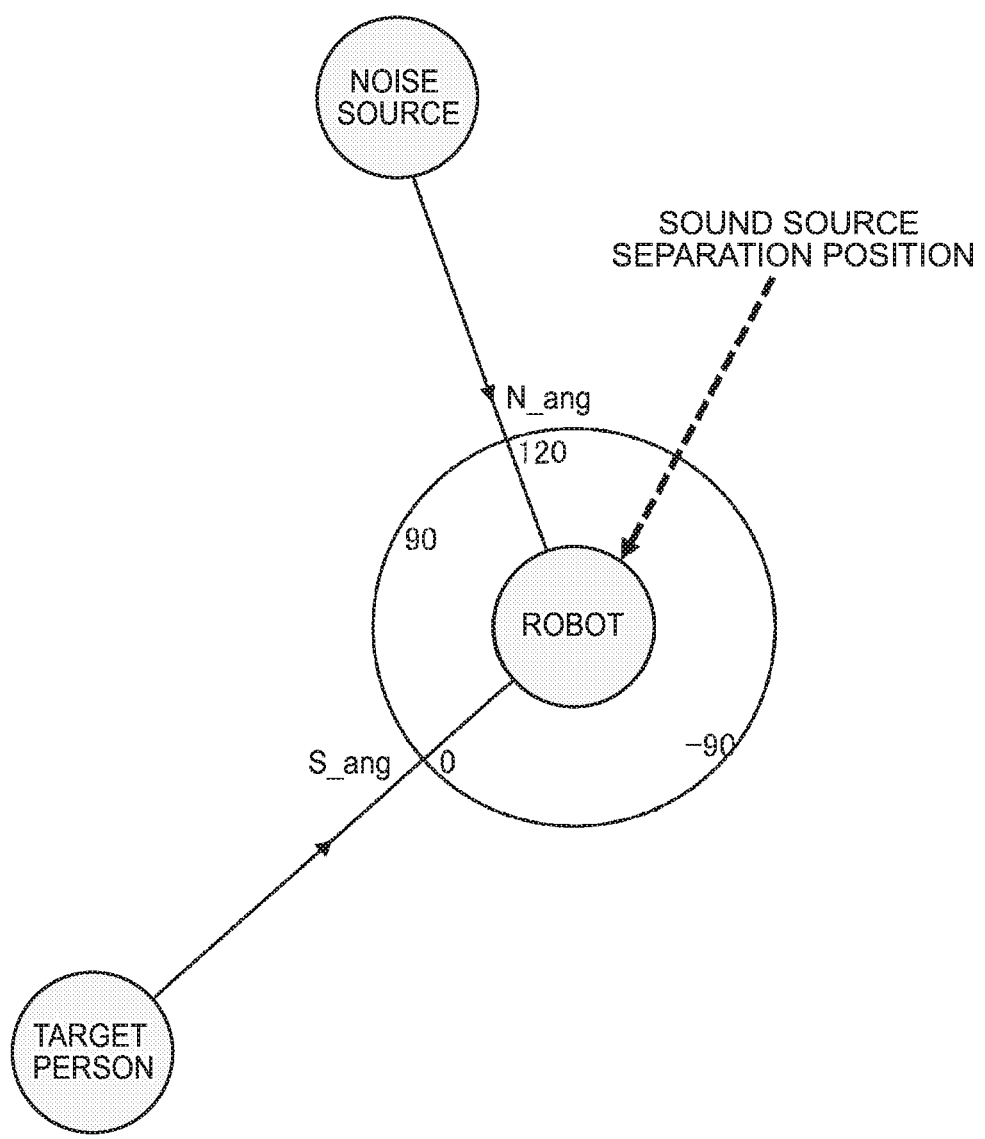
FIG. 12 is an explanatory diagram (3) of the sound source separation information detection.

For example, FIG. 10 illustrates an example of a state where the values of S_ang and N_ang have been calculated as S_ang=0 degrees and N_ang=10 degrees. When viewed from the camera 104 (FIG. 1) of the robot 100, it is understood that the sound source of the noise is present in the 10-degree clockwise direction with respect to the target person. From this state, the control unit 201 in FIG. 2 controls the undercarriage drive unit 108 in FIG. 1 or 2 to move the robot 100, for example, rightward (direction A in FIG. 10) around the target person. Naturally, the robot 100 may be moved leftward. In the case of the example of FIG. 10, however, the rightward movement enables the robot 100 to come closer to the sound source separation position with the shortest distance. FIG. 11 is the diagram illustrating the positional relationship between the robot 100 after the above movement, the target person, and the noise source. With the repetition of the movement as described above, the robot 100 finally moves to the sound source separation position illustrated in FIG. 12 and thereby completes the movement. The sound source separation position causes the absolute value of the difference between the signal voice direction S_ang and the noise direction angle N_ang calculated according to the expression (33) to be about 120 degrees in the case where the microphone array 103 has the directivity characteristics illustrated in FIG. 9.

In the above operation, preferably the control unit 201 in FIG. 2 causes the speaking unit 311 in FIG. 3 to utter words such as "I will move to an easy listening position now" before starting the movement, so that the robot 100 speaks words that causes the target person to stop dialogue during the movement. Alternatively, the robot 100 may be configured to be able to dialogue during movement.

If the S/N ratio is equal to or lower than the threshold value sn_th as the result of the determination of step S410 by the S/N ratio calculation unit 309 in the control processing illustrated in the flowchart of FIG. 4 described above, the control unit 201 may perform control such as, for example, prompting the target person to move, by uttering words having a meaning like "Move to rotate around me by about – degrees" to the target person from the loudspeaker 105 in FIG. 1 or 2 via the speaking unit 311 in FIG. 3.

In addition, while uttering words as described above, the control unit 201 may perform control such as giving an instruction to the target person by uttering words such as "a little more" or "stop" until the continuously-acquired noise direction angle N_ang reaches a favorable angle.

For example, if map information in the room of the building is available, the control unit 201 may perform control such as estimating two- or three-dimensional sound source positions of the target person and the noise on the map and moving the robot 100 to the sound source separation position on the basis of the estimation results. The map of the sound source positions may be made by getting as close as possible to the noise source and identifying the position for registration.

On the other hand, if the map of the sound source positions is unavailable, the noise source position may be estimated on the basis of the noise direction acquired during moving of the robot 100, the position thereof, and the orientation of the body of the robot 100. In this case, if there are two or more observation points, the sound source position is able to be determined. A certain error may be allowed in the estimated direction so that the estimation is performed from more observation points.

Furthermore, it is also possible to perform control of giving the instruction to the target person by uttering words like "rotate—degrees further" on the basis of the estimation result of the sound source position of the noise obtained by using the above map information.

If the robot 100 moves while looking the other way or moves around by itself during moving to the sound source separation position in the above embodiment, the target person feels odd. Therefore, it is preferable that the robot 100 moves to the sound source separation position in such a way that the target person does not feel odd. For example, preferably the robot 100 moves to the sound source separation position while making eye contact with the target person or looking toward the target person. Moreover, the robot 100 may move to the sound source separation position by moving slightly or only rotating, instead of moving to the sound source separation position at the time.

According to the above embodiments, it is possible to detect the optimized sound source separation information (the sound source separation direction or the sound source separation position) which enables the sound source separation in the state where the signal voice is separated from the noise voice most successfully. Thereby, voices other than the voice of the target person can be removed to decrease erroneous voice recognition.

When the control unit 201 in FIG. 2 implements the function illustrated in FIG. 3 by performing the control program 205 stored in the storage unit 202 and illustrated in the processing example of the flowchart of FIG. 4 or 7 in the embodiment described above, the control program 205 may be recorded in, for example, an external storage device or a portable recording medium for distribution or may be allowed to be acquired from a network via a wired communication interface or a wireless communication interface, which is not particularly illustrated.

What is claimed is:

1. A sound source separation information detecting device, comprising:
   a microphone array having predetermined directivity to acquire a voice; and
   a processor configured to:
   detect a first direction, which is an arrival direction of a signal voice of a predetermined target, from the voice acquired by the microphone array;
   detect a second direction, which is an arrival direction of a noise voice, from the voice acquired by the microphone array;
   detect a sound source separation direction or a sound source separation position, based on the first direction and the second direction;
   acquire a lips image of the predetermined target at a timing when the microphone array acquires the voice;
   determine opening of lips of the predetermined target or closing of the lips thereof, based on the acquired the lips image;
   consider the voice acquired by the microphone array at the determination of the opening of the lips as the signal voice;
   consider the voice acquired by the microphone array at the determination of the closing of the lips as the noise voice;
   acquire a face image;

acquire a moving amount of the lips of the predetermined target from the lips image;

acquire a rotation amount of a face of the predetermined target from the face image; and determine the opening of the lips of the predetermined target or the closing of the lips thereof, based on the moving amount of the lips and the rotation amount of the face.

2. The sound source separation information detecting device according to claim 1, wherein, in a case where a signal-to-noise ratio calculated from the signal voice and the noise voice is equal to or lower than a threshold value, the processor detects the sound source separation direction or the sound source separation position in which the signal-to-noise ratio exceeds the threshold value, based on the first direction and the second direction.

3. The sound source separation information detecting device according to claim 2, wherein the processor considers a direction in which the signal-to-noise ratio reaches the maximum exceeding the threshold value as the sound source separation direction or considers a position in which the signal-to-noise ratio reaches the maximum exceeding the threshold value as the sound source separation position.

4. The sound source separation information detecting device according to claim 2, wherein the processor considers a current direction as the sound source separation direction or considers the current position as the sound source separation position in the case where the signal-to-noise ratio exceeds the threshold value.

5. The sound source separation information detecting device according to claim 1, wherein the processor determines the opening of the lips or the closing of the lips in the case where the moving amount of the lips in an opening and closing direction out of the moving amount of the lips exceeds a first threshold value, the moving amount of the lips in a stretching direction out of the moving amount of the lips is less than a second threshold value, and the rotation amount of the face is less than a third threshold value.

6. The sound source separation information detecting device according to claim 1, wherein the processor is further configured to:

detect the first direction, based on signal voice power of the signal voice, at the determination of the opening of the lips;

detect the second direction, based on noise voice power of the noise voice, at the determination of the closing of the lips.

7. The sound source separation information detecting device according to claim 1, wherein the processor is further configured to:

notify a message of the predetermined target, the message including a moving direction and a moving distance to the sound source separation position in order to cause the predetermined target to move from the current position to the sound source separation position.

8. The sound source separation information detecting device according to claim 1, wherein the predetermined target is a human or an animal.

9. A robot, comprising:

the sound source separation information detecting device according to claim 1;

a moving unit configured to move its own device; and an operating unit configured to operate the its own device;

wherein the processor is configured to control the sound source separation information detecting device, the moving unit, and the operating unit.

10. The robot according to claim 9, wherein the processor controls the moving unit to cause the its own device to move to the sound source separation position.

11. The robot according to claim 10, wherein the processor controls the operating unit so that the its own device moves to the sound source separation position while making eye contact with the predetermined target or looking toward the predetermined target.

12. The robot according to claim 10, wherein the processor controls the moving unit and the operating unit so that the its own device moves to the sound source separation position by moving slightly or only rotating, instead of moving straightforwardly to the sound source separation position.

13. A sound source separation information detecting method, comprising:

detecting a first direction, which is an arrival direction of a signal voice of a predetermined target, from a voice acquired by a microphone array having predetermined directivity to acquire the voice;

detecting a second direction, which is an arrival direction of a noise voice, from the voice acquired by the microphone array;

detecting a sound source separation direction or a sound source separation position, based on the first direction and the second direction;

acquiring a lips image of the predetermined target at a timing when the microphone array acquires the voice;

determining opening of lips of the predetermined target or closing of the lips thereof, based on the acquired the lips image;

considering the voice acquired by the microphone array at the determination of the opening of the lips as the signal voice;

considering the voice acquired by the microphone array at the determination of the closing of the lips as the noise voice;

acquiring a face image;

acquiring a moving amount of the lips of the predetermined target from the lips image;

acquiring a rotation amount of a face of the predetermined target from the face image; and determining the opening of the lips of the predetermined target or the closing of the lips thereof, based on the moving amount of the lips and the rotation amount of the face.

14. A non-transitory computer-readable storage medium having stored thereon a program that is executable by a computer of a sound source separation information detecting device to control the computer to perform functions comprising:

detecting a first direction, which is an arrival direction of a signal voice of a predetermined target, from a voice acquired by a microphone array having predetermined directivity to acquire the voice;

detecting a second direction, which is an arrival direction of a noise voice, from the voice acquired by the microphone array;

detecting a sound source separation direction or a sound source separation position, based on the first direction and the second direction;

acquiring a lips image of the predetermined target at a timing when the microphone array acquires the voice;

determining opening of lips of the predetermined target or closing of the lips thereof, based on the acquired the lips image;

considering the voice acquired by the microphone array at the determination of the opening of the lips as the signal voice;

considering the voice acquired by the microphone array at the determination of the closing of the lips as the noise voice;

acquiring a face image;

acquiring a moving amount of the lips of the predetermined target from the lips image;

acquiring a rotation amount of a face of the predetermined target from the face image; and determining the opening of the lips of the predetermined target or the closing of the lips thereof, based on the moving amount of the lips and the rotation amount of the face.

* * * * *